US007286529B1

United States Patent
Thomas

(10) Patent No.: US 7,286,529 B1
(45) Date of Patent: *Oct. 23, 2007

(54) DISCOVERY AND TAG SPACE IDENTIFIERS IN A TAG DISTRIBUTION PROTOCOL (TDP)

(75) Inventor: Robert H. Thomas, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 782 days.

This patent is subject to a terminal disclaimer.

(21) Appl. No.: 10/351,111

(22) Filed: Jan. 24, 2003

Related U.S. Application Data

(63) Continuation of application No. 09/258,530, filed on Feb. 26, 1999, now Pat. No. 6,512,768.

(51) Int. Cl.
*H04L 12/28* (2006.01)

(52) U.S. Cl. .................................. 370/389; 370/392

(58) Field of Classification Search ................ 370/351, 370/389, 386, 396, 395.1, 395.2, 395.3, 400–402, 370/392, 397, 393, 395.5, 395.52
See application file for complete search history.

(56) References Cited

U.S. PATENT DOCUMENTS 5,243,342 A  9/1993  Kattemalalavadi et al.

(Continued)

OTHER PUBLICATIONS

P. Newman et al., "Ipsilon Flow Management Protocol Specification for Ipv4 Version 1.0," Internet Community's Request for Comments No. 1953, May 1996.

(Continued)

*Primary Examiner*—Brenda Pham
(74) *Attorney, Agent, or Firm*—Cesari and McKenna LLP

(57) ABSTRACT

A tag-switching router on a tag-switching network establishing a single tag distribution protocol (TDP) session with a peer for the advertisement of tag bindings shared by two or more interfaces and contemporaneously establishing with the peer one or more additional TDP sessions for the advertisement of tag bindings dedicated for use by specific interfaces. Each router interface has an assigned tag space comprised incoming tags that are appended by the peer to input data packets forwarded by the peer. A new Hello message carried in a TDP protocol data unit (PDU) is introduced for use in a TDP discovery mechanism. The router periodically multicasts a specific Hello message from each tag-switching enabled interface and a router TDP identifier in the TDP PDU header identifies the tag space that the router has assigned to the interface. When the router receives a Hello message from the peer at one of its interfaces, the router records the peer TDP identifier in a record associated with the interface to create a link adjacency. The router and peer establish a conventional TDP session to exchange tag binding sets. The router transmits to the peer a Bind message containing advertised tag bindings which, in turn, contain the incoming tags for the tag space identified by the router TDP identifier in the TDP PDU header. The router receives from the peer a Bind message from the peer containing learned tag bindings which, in turn, contain the outgoing tags for the tag space identified by the peer TDP identifier in the TDP PDU header. The router appends outgoing tags to received data packets having destination addresses bound to the learned tag bindings and forwards the tagged received data packets to the peer from the associated interface.

21 Claims, 14 Drawing Sheets

U.S. PATENT DOCUMENTS

| | | | |
|---|---|---|---|
| 5,274,643 | A | 12/1993 | Fisk |
| 5,353,283 | A | 10/1994 | Tsuchiya |
| 5,394,402 | A | 2/1995 | Ross |
| 5,426,637 | A | 6/1995 | Derby et al. |
| 5,430,715 | A | 7/1995 | Corbalis et al. |
| 5,452,294 | A | 9/1995 | Natarajan |
| 5,473,599 | A | 12/1995 | Li et al. |
| 5,491,692 | A | 2/1996 | Gunner et al. |
| 5,500,860 | A | 3/1996 | Perlman et al. |
| 5,519,704 | A | 5/1996 | Farinacci et al. |
| 5,555,256 | A | 9/1996 | Calamvokis |
| 5,561,669 | A | 10/1996 | Lenney et al. |
| 5,594,732 | A | 1/1997 | Bell et al. |
| 5,617,417 | A | 4/1997 | Sathe et al. |
| 5,617,421 | A | 4/1997 | Chin et al. |
| 5,621,721 | A | 4/1997 | Vantuaone |
| 5,623,492 | A | 4/1997 | Teraslinna |
| 5,650,993 | A | 7/1997 | Lakshman et al. |
| 5,651,002 | A | 7/1997 | Van Seters et al. |
| 5,659,542 | A | 8/1997 | Bell et al. |
| 5,673,265 | A | 9/1997 | Gupta et al. |
| 5,740,171 | A | 4/1998 | Mazzola et al. |
| 5,740,176 | A | 4/1998 | Gupta et al. |
| 5,742,604 | A | 4/1998 | Edsall et al. |
| 5,764,636 | A | 6/1998 | Edsall |
| 5,793,763 | A | 8/1998 | Mayes et al. |
| 5,835,494 | A | 11/1998 | Huges et al. |
| 5,838,994 | A | 11/1998 | Valizadeh |
| 5,867,666 | A | 2/1999 | Harvey |
| 5,991,300 | A | 11/1999 | Tappan |
| 6,275,492 | B1 | 8/2001 | Zhang |
| 6,295,296 | B1 | 9/2001 | Tappan |
| 6,337,861 | B1 | 1/2002 | Rosen |
| 6,339,595 | B1 | 1/2002 | Rekhter et al. |
| 6,430,155 | B1 | 8/2002 | Davie et al. |
| 6,463,061 | B1 | 10/2002 | Rekhter et al. |
| 6,512,768 | B1 * | 1/2003 | Thomas ...................... 370/389 |
| 6,526,056 | B1 | 2/2003 | Rekhter et al. |

OTHER PUBLICATIONS

M. Perez et al., "ATM Signaling Support for IP over ATM," Internet Community's Request for Comments No. 1755, Feb. 1995.

J. Heinanen, "Multiprotocol Encapsulation over ATM Adaption Layer 5," Internet Community's Request for Comments No. 1483, Jul. 1993.

M. Laubach, "IP over ATM Working Group's Recommendations for the ATM Forum's Multiprotocol BOF Version 1," Internet Community's Request for Comments No. 1754, Jan. 1995.

M. Laubach, "Classical IP and ARP over ATM," Internet Community's Request for Comments No. 1577, Jan. 1994.

Martin de Prycker, "Asynchronous Transfer Mode Solution for Broadband ISDN," Prentice Hall, 1995, pp. 5-11 and 87-90.

D. Ginsburg, "ATM Solutions for Enterprise Internetworking," Addison-Wesley Longman 1996, pp. xv-xiv, 36-41 and 72-76.

R. Ullman, "Rap: Internet Route Access Protocol," Internet Community's Request for Comments No. 1476, Jun. 1993.

M. McGovern, et al., "CATNIP: Common Architecture For The Internet," Internet Community's Request for Comments No. 1707, Oct. 1994.

S. Deering, et al., "Internet Protocol, Version 6," Internet Community's Request for Comments No. 1883, Dec. 1995.

"Information Technology-Telecommunications And Information Exchange Between Systems-Protocol For Exchange Of Inter-Domain Routeing Information Among Intermediate Systems To Support Forwarding Of ISO 8473 PDU's," International Standard ISO/IEC 10747, Oct. 1, 1994.

"Amendment 1: Implementation conformance statement proformas", InternationalStandard ISO/IEC 10747, Jul. 15, 1996.

K. Nagami et al., "Toshiba's Flow Attribute Notification Protocol (FANP) Specification," Internet Community's Request for Comments No. 2129, Apr. 1997.

Y. Katsube et al., "Toshiba's Router Architecture Extensions for ATM: Overview," Internet Community's Request for Comments No. 2098, Feb. 1997.

A. Viswanathan et al., "ARIS: Aggregate Route-Based IP Switching," Internet Draft, <draft-viswanathan-aris-overview-00.txt.>, Mar. 1997.

P. Newman et al., "Ipsilon;s General Switch Management Protocol Specification Version 1.1," Internet Community's Request for Comments No. 1987, Aug. 1996.

N. Feldman, "ARIS Specification," Internet Draft, <draft-feldman-aris-spec-00.txt>, Mar. 1997.

"ISDN Data Link Layer Specification for Frame Mode Bearer Services," CCITT Recommendation Q.922, International Telecommunication Union, Geneva, 1992.

"Digital Subscriber Signalling Systm No. 1 (DSS 1)—Signalling Specification for Frame Mode Basic Call Control," ITU-T Recommendation Q. 933, International Telecommunication Union, Geneva, 1994.

G. P. Chandranmenon and G. Varghese, "Trading Packet Keader for packet Processing," Proc. ACM SIGCOMM 1995, Boston, MA Sep. 1995, pp. 162-173.

Callon et al., A Framework for Multiprotocol Label Switching, IETF Network Workign Group Internet Draft, <draft-ietf-mpls-framework-02.txt>, Nov. 21, 1997.

Rosen et al., "A proposed Architecture for MPLS," IETF Network Working Group Internet Draft, <draft-ietf-mpls-arch-00.txt>, Aug. 1997.

Woundy et al., "ARIS: Aggregate Route-Based IP Switching," Internet Draft, <draft-woundy-aris-ipswitching-00.txt>, Nov. 1996.

Kalyaranaman et al., "Performance and Buffering Requirements of Internet Protocols over ATM ABR and UBR Services," "IEEE Communications Magazine," vol. 36 No. 6, Jun. 1998.

Feldman et al., "LDP Specification," Internet Draft, <draft-mpls-ldp-00.txt>, Sep. 1998.

Doolan et al., "Tag Distribution Protocol," Network Working Group Internet Draft, <draft-doolan-tdp-spec-01.txt>, Nov. 1997.

J. Heinanen, "VPN support for MPLS," Internet Engineering Task Force Internet Draft, <draft-heinanen-mpls-vpn-00.txt>, Dec. 1997.

\* cited by examiner

DISCOVERY AND TAG SPACE IDENTIFIERS IN A TAG DISTRIBUTION PROTOCOL (TDP)

RELATED APPLICATIONS

The present application is a continuation of U.S. Ser. No. 09/258,530 commonly assigned U.S. Pat. No. 6,512,768, which was filed on Feb. 26, 1999, and issued on Jan. 28, 2003, by Robert H. Thomas for "DISCOVERY AND TAG SPACE IDENTIFIERS IN A TAG DISTRIBUTION PROTOCOL (TDP)."

The subject application is related to the following applications:

U.S. patent application Ser. No. 08/997,343, now issued as U.S. Pat. No. 6,339,595, filed Dec. 23, 1997, and entitled, "PEER-MODEL SUPPORT FOR VIRTUAL PRIVATE NETWORKS WITH POTENTIALLY OVERLAPPING ADDRESSES";

U.S. patent application Ser. No. 09/149,193, now issued as U.S. Pat. No. 6,295,296, filed Sep. 8, 1998, and entitled, "USE OF A SINGLE DATA STRUCTURE FOR LABEL FORWARDING AND IMPOSITION";

U.S. patent application Ser. No. 09/149,403, now issued as U.S. Pat. No. 5,991,300, filed Sep. 8, 1998, and entitled, "TECHNIQUE FOR EFFICIENTLY PERFORMING OPTIONAL TTL PROPAGATION DURING LABEL IMPOSITION";

U.S. patent application Ser. No. 09/201,337, now issued as U.S. Pat. No. 6,430,155, filed Nov. 30, 1998, and entitled, "CONGESTION AVOIDANCE ON COMMUNICATIONS NETWORKS";

U.S. patent application Ser. No. 09/217,976, now issued as U.S. Pat. No. 6,526,056, filed Dec. 21, 1998, and entitled, "VIRTUAL PRIVATE NETWORK EMPLOYING EGRESS-CHANNEL SELECTION"; and U.S. patent application Ser. No. 09/232,947, now issued as U.S. Pat. No. 6,463,061, filed Jan. 19, 1999, and entitled, "SHARED COMMUNICATIONS NETWORK EMPLOYING VIRTUAL-PRIVATE-NETWORK IDENTIFIERS".

U.S. patent application Ser. No. 09/241,997, now issued as U.S. Pat. No. 6,337,861, filed Feb. 2, 1999, and entitled, "METHOD AND APPARATUS TO PROPERLY ROUTE ICMP MESSAGES IN A TAG-SWITCHING NETWORK".

Each of said applications is assigned to the Assignee of the subject application and is incorporated herein by reference in its entirety.

BACKGROUND OF THE INVENTION

The present invention is directed to communications networking. It is directed particularly to a tag distribution protocol employed on a tag-switching network.

Internetworking, Routers and the Internet Protocol

Two local area networks, LAN A 10 and LAN B 20, interconnected through a "backbone" of routers 2, 4, 6, 8 are shown in FIG. 1. A router may have a plurality of interfaces to one or more local networks or to other routers. LAN A includes a router 2 and three host devices 14, 16, 18 which can communicate directly with each other over the LAN A bus 12, and LAN B includes a router 8 and three host devices 24, 26, 28 which can communicate directly with each other over the LAN B bus 22. Two directly connected, or linked, devices communicate through the exchange of link-layer, e.g., Ethernet, communications packets.

The exchange of data between two indirectly connected devices, e.g., HOST A1 14 of LAN A and HOST B1 24 of LAN B, is typically accomplished at the network layer using an Internet Protocol (IP) datagram. The IP datagram is typically forwarded in the payload field of link-layer communications packets that are exchanged between the backbone routers. The use of an IP datagram allows for the routing of data between network devices that do not have a link-layer connection and, therefore, cannot exchange link-layer packets with each other.

An Ethernet packet 200 having an IP datagram in its payload field 206 is shown in FIG. 2. The IP datagram is encapsulated between an Ethernet header field 202 and a trailing CRC field 204. The Ethernet header field 202 includes a type field 203 that specifies that the payload field 206 contains an IP datagram. The IP datagram includes an IP payload field 208 preceded by an IP header field 210. The IP header field 210 includes a source IP address field 212 (containing IP address "X") and a destination IP address field 214 (containing IP address "Y"). The source address field 212 identifies the originator of the IP datagram, e.g. HOST A1 14, and the destination address field 214 identifies the intended recipient of the IP datagram, e.g. HOST B1 24.

Routers commonly employ some type of discovery mechanism to automatically identify and maintain links to other routers and thereby avoid the need for explicit network configuration. Under a discovery mechanism, a router periodically broadcasts from each interface a special type of link-layer packet, typically referred to as a Hello packet, to inform other routers of its presence in the network. The router "discovers" a link to another router when a Hello packet is received at one of its interfaces. To verify the ongoing operation of a particular link, the router establishes a hello hold timer associated with the linked router and resets the timer each time a subsequent Hello packet is received at the interface from the linked router. If the router fails to receive a subsequent Hello packet before the timer expires, it assumes that the link is no longer available. The failure to receive a new Hello packet may be due to a poor link connection between the two routers, or the linked router may have failed or perhaps decided for some reason to disable that particular interface.

A conventional backbone router typically determines the link over which the IP datagram is to be forwarded by referring to a forwarding table, which contains routing information learned from neighbor routers and maintained by the router. Using the "Y" address in the destination IP address field 214, the router performs a longest match search against IP addresses stored in the table. Unfortunately, because the IP address space is so large, the forwarding table may have to be very large. More importantly, a longest match search through the forwarding table can be time consuming and result in the expenditure of valuable router processing resources and a slowing of the movement of packets through the network.

A Tag-Switching Network

A technique known variously as "tag-switching" or "label-switching" is one way of avoiding the longest match searches. Although the invention to be described below is not limited to any particular implementation of tag switching, one popular method for implementing it is called Multi-Protocol Label Switching (MPLS) and is described in the above-cited Rekhter et al. application.

An Ethernet packet 300 carrying a tagged IP datagram in its payload field 306 is shown in FIG. 3. The type field 305 of the Ethernet packet is used to identify the payload contents as a tagged datagram and thus distinguish it from a normal IP datagram. A tag stack field 320 is prepended to the IP payload field 306 and is comprised of one or more "tags," or "labels," employed for forwarding. In this case, the tag stack field 320 contains a single tag stack entry 322. A tag-switching router uses the contents of the tag field 324 in place of the destination address 303 to determine the forwarding route of the packet.

FIG. 4 illustrates the exchange of an IP datagram over one type of tag-switching network. For simplicity, only the destination IP address field 314 (containing IP address "D1") and the IP payload field 308 (containing "DATA") of the IP datagram are shown in FIG. 4. The tag-switching network is comprised of a first tag-switching edge router TE1 interfacing to a first router R1 of a first local network; two tag-switching transit routers T1, T2 connecting the tag-switching edge router TE1 to a second tag-switching edge router TE2; and tag-switching edge router TE2 interfacing to a second router R2 of a second local network.

We assume that router R2 sends tag-switching edge router TE2 an IP datagram within an Ethernet packet of the type depicted in the second row of FIG. 2. When tag-switching edge router TE2 receives the IP datagram from router R2, it prefixes a tag T1 that identifies an entry in the forwarding table of the next router, i.e., the first transit router TR2, in the backbone path. When the transit router TR2 receives the IP datagram, it uses the tag T1 to identify the location in its forwarding table that specifies the forwarding link to the edge router TE1; i.e., the transit router TR2 does not have to perform a time-consuming longest-match search. It then replaces the tag T1 with the replacement tag T2 that identifies an entry in the forwarding table of the second transit router TR1 in the backbone path and forwards the IP datagram. (We assume that, as in the typical case, there are several transit routers in the backbone path, although in some configurations there may be none. All transit routers, except the last transit router in the backbone path, perform in a manner similar to that of transit router TR2.) When the second transit router TR1, which is also the last transit router in the backbone path, receives the IP datagram, it uses tag T2 to identify an entry in its forwarding table specifying the forwarding link, removes tag T2, and then forwards the untagged IP datagram. When the edge router TE1 receives the IP datagram, it forwards the data packet to R1 in the conventional manner.

The ATM Protocol

Although the tag-over-Ethernet protocol illustrated in FIG. 3 is typical for packets exchanged between tag-switching routers, it is not the only protocol that such routers may employ. The protocols employed on some links types are actually somewhat more complicated than the protocol depicted in FIG. 3. Moreover, routers that communicate with each other over a point-to-point link, i.e., not by way of a shared medium, typically would employ a link-layer protocol, such as SLIP or PPP, that is different from the Ethernet protocol just described. An implementation that is particularly desirable for high-capacity links employs Asynchronous Transfer Mode ("ATM") switches.

An ATM frame 500 having an IP datagram in its payload field 507 is shown in FIG. 5. The IP datagram field 506 and a tag stack field 520 of the payload field 507 are similar to the IP datagram field 306 and tag stack field 320 encapsulated by the Ethernet header 302 and trailer 304 of FIG. 3. The only difference is that the tag field 524 of the single tag stack entry 522 contains a "DON'T CARE," which indicates that the tag's contents do not matter.

The reason why the tag's contents do not matter is that the routing decisions, which are based on those contents when the tagged packet arrives on a non-ATM link, are instead based on an ATM VPI/VCI field 546 found in the cell header field 544 of an ATM "cell" 540 when the tagged packet arrives on an ATM link. From the point of view of an ATM client, the ATM frame 500 is the basic unit of transmission, and it can vary in length to as much as 64 Kbytes of payload. (Those skilled in the art will recognize that there are also other possible ATM frame formats, but FIG. 5's third row depicts one, known as "AAL5," that would typically be employed for user data.) From the ATM switch's point of view, though, the basic transmission units are fixed-size cells into which the frames are divided. The cell header field 544, shown in detail in the first row, also includes a PTI field 548. One purpose of the PTI field 548 is to indicate whether its cell is the last one in a frame. If it is, its last eight bytes form the frame trailer field 504. Among other things, the trailer field 504 indicates how much of the preceding cell's payload field 542 is comprised of actual payload, as opposed to padding used to complete a fixed-size cell.

The VPI/VCI field 546 is of particular interest to the present discussion. As is well known to those skilled in the art, ATM systems organize their routes into "virtual channels," which may from time to time be grouped into "virtual paths." Each switch associates a local virtual path/virtual channel indicator (VPI/VCI) with a channel or path that runs through it. When an ATM switch receives a cell, it consults the cell's VPI/VCI field 546 to identify by table lookup the interface through which to forward the cell. It also replaces that field's contents with a value indicated by the table as being the next switch's code for that path or channel, and it sends the resultant cell to the next switch. In other words, the function performed by the VPI/VCI field 546 enables it to serve as the tag and, as a result, a tag-switching interface implemented as an ATM switch can ignore the tag field 524, on which other implementations for other links rely.

Tag Distribution

As described above, a tag-switching router forwards a tagged packet to a peer based on the contents of a forwarding table entry pointed to by the top tag in the prepended tag stack. These contents are referred to as a tag binding because they "bind" the tag to a particular route. It is the peer router that actually "constructs" the forwarding table through a tag distribution procedure that is executed upon establishment of a tag-switching link. One method for distributing tag bindings is described in an Internet Engineering Task Force (IETF) draft entitled "Tag Distribution Protocol", draft-doolan-tdp-spec-01.txt, May 1997, which constitutes Appendix B of above-cited Rekhter et al. application.

Tag-switching router peers establish a tag distribution protocol (TDP) session on a transport control protocol (TCP) connection to distribute, or "advertise," tag bindings to each other. A TDP protocol data unit (PDU) is used for the transmission of one or more session messages. Each session message is formatted as a protocol information element (PIE), and one or more PIEs are carried within the payload field 628 of the TDP PDU, as illustrated in the second row of FIG. 6. The TDP PDU is placed within the payload field 618 of a TCP segment, which is transmitted to the peer in the payload field 608 of an IP datagram. The destination IP address field 614 of the IP datagram header 610 contains the IP address of the receiving router interface, and the source IP address field 612 contains the IP address of the transmitting router interface.

The TDP PDU includes a header field 630 comprised of a version field 632, a length field 634, a TDP identifier consisting of an router ID field 636 and a TDP instance field 637, and a field 638 reserved for future use. The version field 632 is a two-octet unsigned integer specifying the version number of the tag distribution protocol. The length field 634 is a two-octet integer specifying the total length of the PDU in bytes, excluding the version and length fields. The TDP identifier is six octets in total length. The router ID field typically contains a 32-bit "stable" address, i.e., one that is not lost when interfaces or physical connections go down, and it is often the IP address of the "logical" or "loopback" interface. By convention, a router encodes the same router ID in all its TDP messages. The two-octet TDP instance field 637 represents a particular TDP session between a router and a peer.

A TDP PIE has a type-length-value (TLV) structure, as illustrated by the Bind PIE 650 of the third row of FIG. 6. The two-octet type field 652 specifies the contents of the value field. The two-octet length field 654 specifies the length of the value field in octets. The value field 660, depending upon the message type, may include one or more mandatory parameters and one or more optional parameters. The value field 660 of the Bind PIE 650 includes a binding list field 670 consisting of a plurality of tag binding entries 680 having tag subfields 684 containing the above-described tags.

The peers will maintain the TDP session for as long as the tag-switching exchange of packets is to occur between them. The tag bindings themselves may apply to one or more tag switching links between the peers.

Multi-Linked Tag-Switching Router Peers

A tag-switching router may have more than one tag-switching enabled interface connecting it to a peer, and FIG. 7 illustrates two routers P1, P2 having four links L1, L2, L3, L4. As mentioned above, a router uses an incoming tag in place of the destination address and interprets the tag by referring to a tag binding distributed by the next router in the destination route of a received data packet. An interface can be classified in terms of its ability to make the same interpretation on the incoming tag as made by other interfaces. Interfaces of a first type, such as an Ethernet, PPP or fiber distributed data interface (FDDI) interface, each make the same interpretation and thus may easily share the same set of tag bindings. Interfaces of a second type, however, such as an ATM interface or frame relay interface, each make a unique interpretation of the incoming tag and therefore require a dedicated set of tag bindings. For example, the ATM switching operation, which is usually implemented in the interface hardware to achieve maximum performance, maintains a hardware forwarding table that contains routing information having a physical significance. As a result, in general, each ATM interface on a router places a different interpretation of the same incoming VPI/VCI tag value.

Accordingly, the tag-switching ATM links L1, L4 of FIG. 7 must each employ dedicated tag bindings which are different from the platform-wide tag bindings that may be shared by the two Ethernet links L2, L3. Unfortunately, the conventional tag distribution protocol provides for either the establishment of a single TDP session for the distribution of a set of platform-wide tag bindings, or the establishment of a separate TDP session for each and every tag-switching link. This results in a needless session redundancy when most, but not all, of the interfaces are sharing the same tag bindings.

SUMMARY OF THE INVENTION

I have recognized that there is a way for a tag-switching router to establish a single TDP session for the distribution of a platform-wide tag space when at least one of its interfaces requires an interface specific tag space. This invention is a particularly simple improvement to the tag distribution protocol (TDP) that introduces the notion of a "tag space." A tag space is defined as the set of incoming tags that a router has assigned to an interface, and it may be either an interface-specific tag space or a platform-wide tag space assigned to one or more interfaces. Each tag space is uniquely identified by a TDP identifier consisting of a router ID and a tag space ID. The router ID is typically an IP address that uniquely identifies the router on a tag-switching network, and the tag space ID is a two-octet number that uniquely identifies a tag space within the router. A router distributes, or "advertises," a set of corresponding outgoing tag bindings to a peer during a TDP session, and a separate session is established for each tag space.

Tag-switching routers incorporating the present invention employ a new Hello protocol information element (PIE) in a TDP discovery mechanism to dynamically identify and maintain links to peers. Each router periodically multicasts a specific Hello PIE from each interface enabled for tag-switching. The Hello PIE is carried in the payload of a TDP protocol distribution unit (PDU), and the TDP PDU is multicast in the payload of a User Datagram Protocol (UDP) datagram. The TDP instance field of the TDP identifier found in the conventional TDP PDU header is replaced by a newly-defined tag space ID field that specifies the tag space the router has assigned to the interface, with the null value (00) indicating a platform-wide tag space. When a router receives a Hello PIE from a peer at one of its tag-switching enabled interfaces, it records the peer TDP identifier in a record associated with the interface and establishes a corresponding hello hold timer to create a link adjacency.

The router and the peer establish a TDP session on a transport control protocol (TCP) connection for the exchange of tag bindings. The router transmits a Bind PIE to the peer to advertise a set of tag bindings, each tag binding associating a destination address with an incoming tag that the peer appends when forwarding to the router data packets with that destination. The Bind PIE is carried in the payload of a TDP PDU, and the TDP PDU is transmitted in the payload of a TCP segment. The router uses the TDP identifier of the TDP PDU header to specify the tag space to which the advertised tag bindings correspond. The router receives a Bind PIE from the peer containing a set of tag bindings and the router matches the TDP identifier of the TDP PDU header to the TDP identifier found in a link adjacency record to thereby associate these learned tag bindings with one or more of its interfaces to the peer. A data packet received at the router and having a destination address bound to one of these learned tag bindings is appended with a corresponding outgoing tag and then forwarded to the peer from an associated interface.

BRIEF DESCRIPTION OF THE DRAWINGS

The invention description below refers to the accompanying drawings, of which.

DETAILED DESCRIPTION OF AN ILLUSTRATIVE EMBODIMENT

Figure 8:
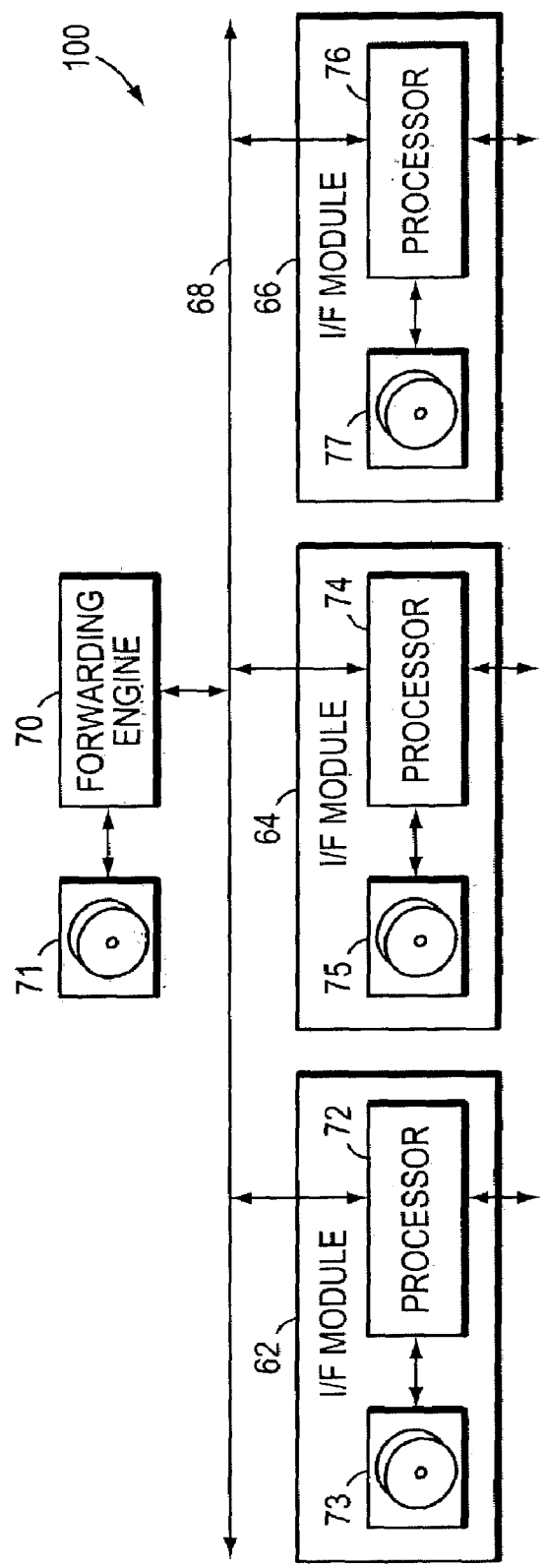
FIG. 8 is a block diagram of a tag-switching router incorporating the present invention.

FIG. 8 is a block diagram of a tag-switching router 100 incorporating the invention. The operation of a tag-switching router is described in the above-cited Rekhter et al. application. Although router configurations vary widely, FIG. 8 depicts a typical approach. The tag-switching router 100 is comprised of a forwarding engine 70 and a plurality of interface (I/F) modules 62, 64, 66 which send and receive communications packets to and from remote locations. The forwarding engine 70 is a high-performance processor that controls the routing of packets through the tag-switching router 60. Instructions executed by the forwarding engine 70 are stored in a persistent storage device, such as a magnetic disk media, EPROM or flash EPROM memory, and executed from a fast and volatile semiconductor storage device, these storage devices being generally represented by memory circuitry element 71. The I/F modules 62, 64, 66 include a similar high-performance processor 72, 74, 76 and associated memory circuitry 73, 75, 77. Packets are routed between the I/F modules via a communications bus 68, which also supports the transfer of routing information between the modules and a forwarding engine 70. It will be recognized by those skilled in the art that different routers may allocate various functions between the forwarding engine and the interface modules in different ways, and that the various processors may share one or more common storage devices.

FIG. 9 is a topological diagram illustrating the operation of a TDP discovery mechanism that may be executed by the tag-switching router 100, designated as "TSR1" in the diagram. TSR1 has three tag-switching enabled interfaces, one of which is an ATM interface. As shown in FIG. 9A, TSR1 is not pre-configured when it is first deployed onto the network, i.e., it has no knowledge of which tag-switching routers, if any, are linked to its three tag-switching enabled interfaces. TSR1 commences to periodically multicast a specific Hello PIE from each tag-switching enabled interface, as shown in FIG. 9B.

Figure 10:
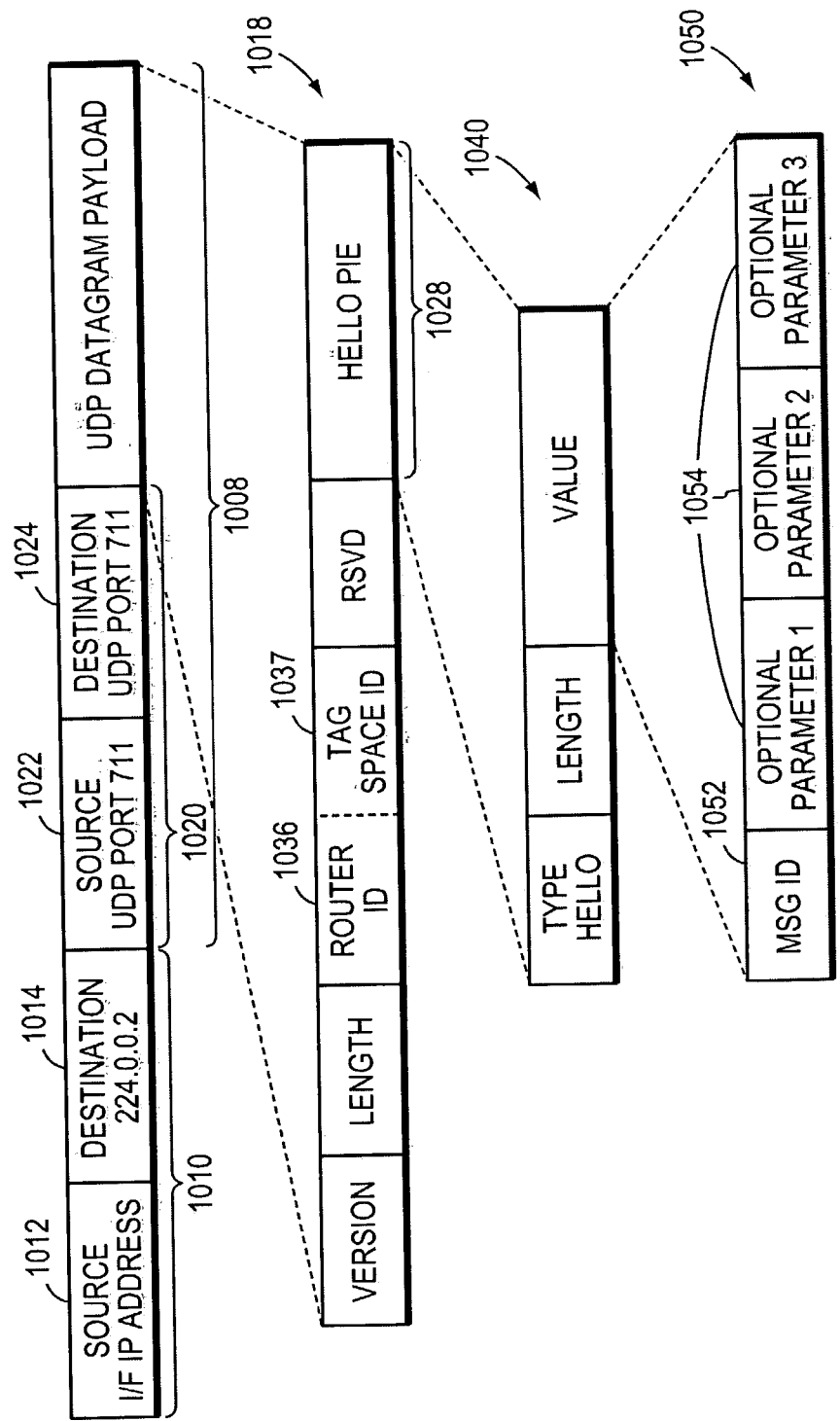
FIG. 10 illustrates the format of a user datagram protocol (UDP) datagram carrying a TDP PDU having a header that includes a new tag space ID field and a payload containing a novel Hello PIE, and multicast from a specific interface by the inventive tag-switching router.

The Hello PIE 1040 is a transmitted in the payload field 1028 of a TDP PDU, as illustrated in FIG. 10. The Hello PIE value field 1050 may carry one or more optional parameters used to specify values that override default settings. One example of an optional parameter is a transport address for the sending router, discussed below in conjunction with the TDP session establishment procedure. Another example is the hello hold time period, used by the receiving router to set the hello hold timer that is used to verify the periodic reception of Hello PIEs from the sending router.

Figure 1:
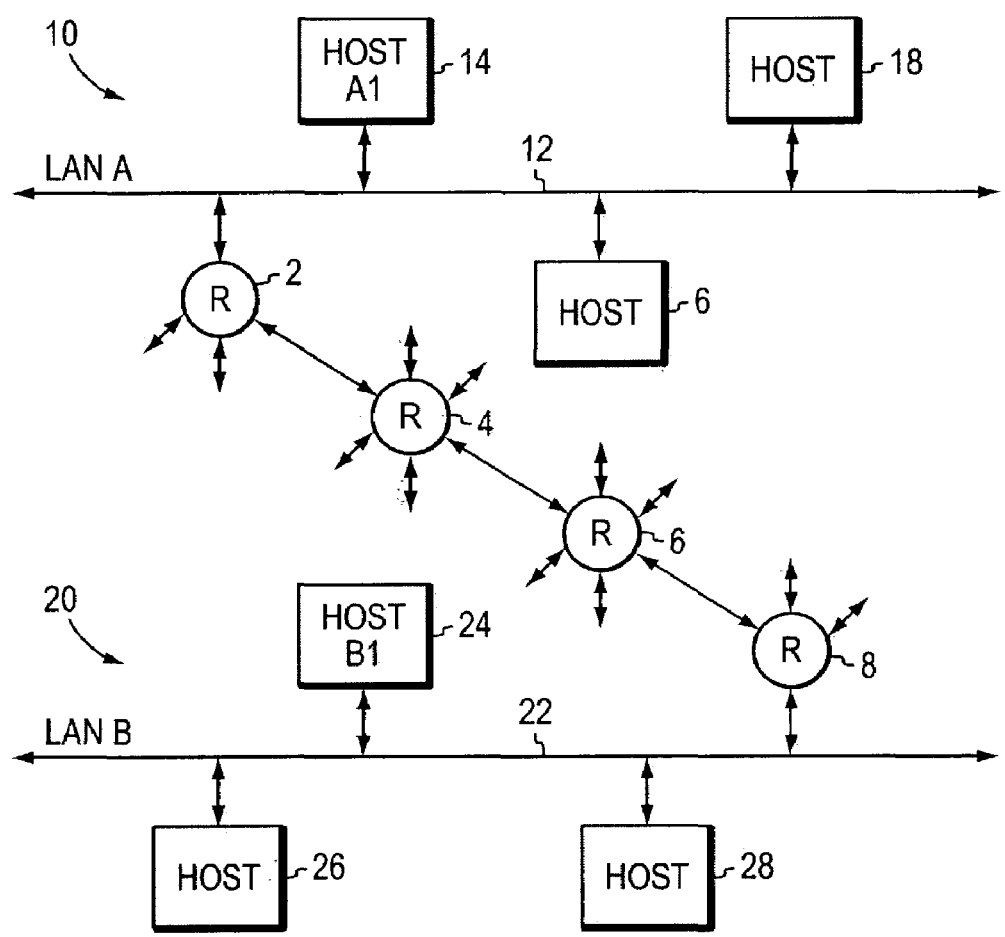
FIG. 1, discussed above, depicts two local area networks interconnected by a backbone of routers.
Figure 2:
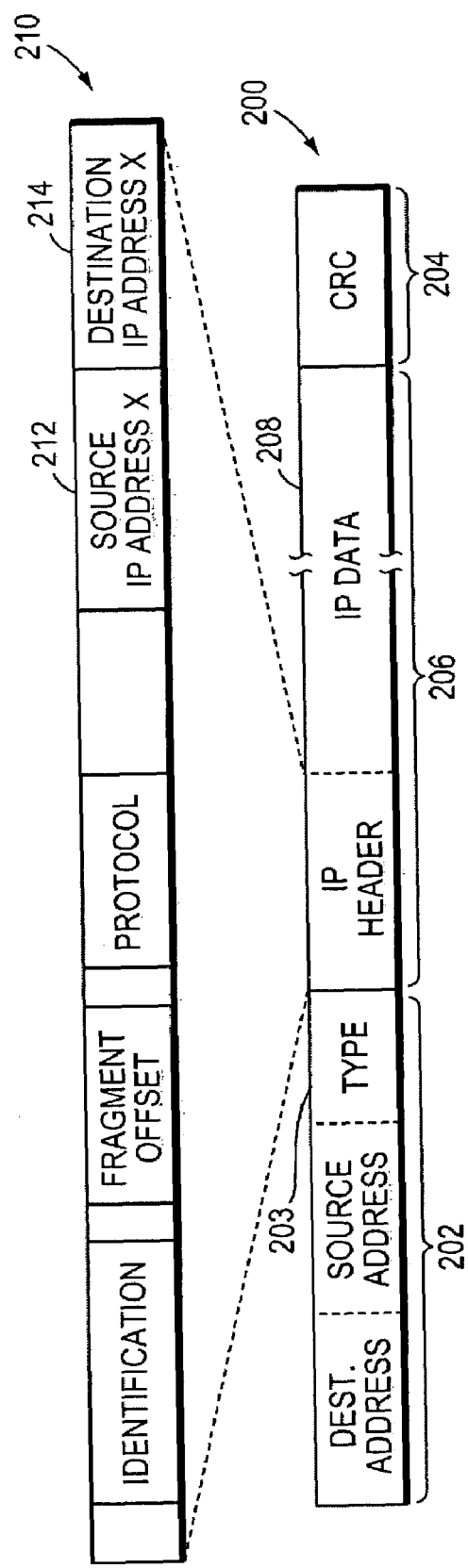
FIG. 2, discussed above, illustrates the format of an Ethernet packet containing a IP datagram and transmitted from one router to another.
Figure 3:
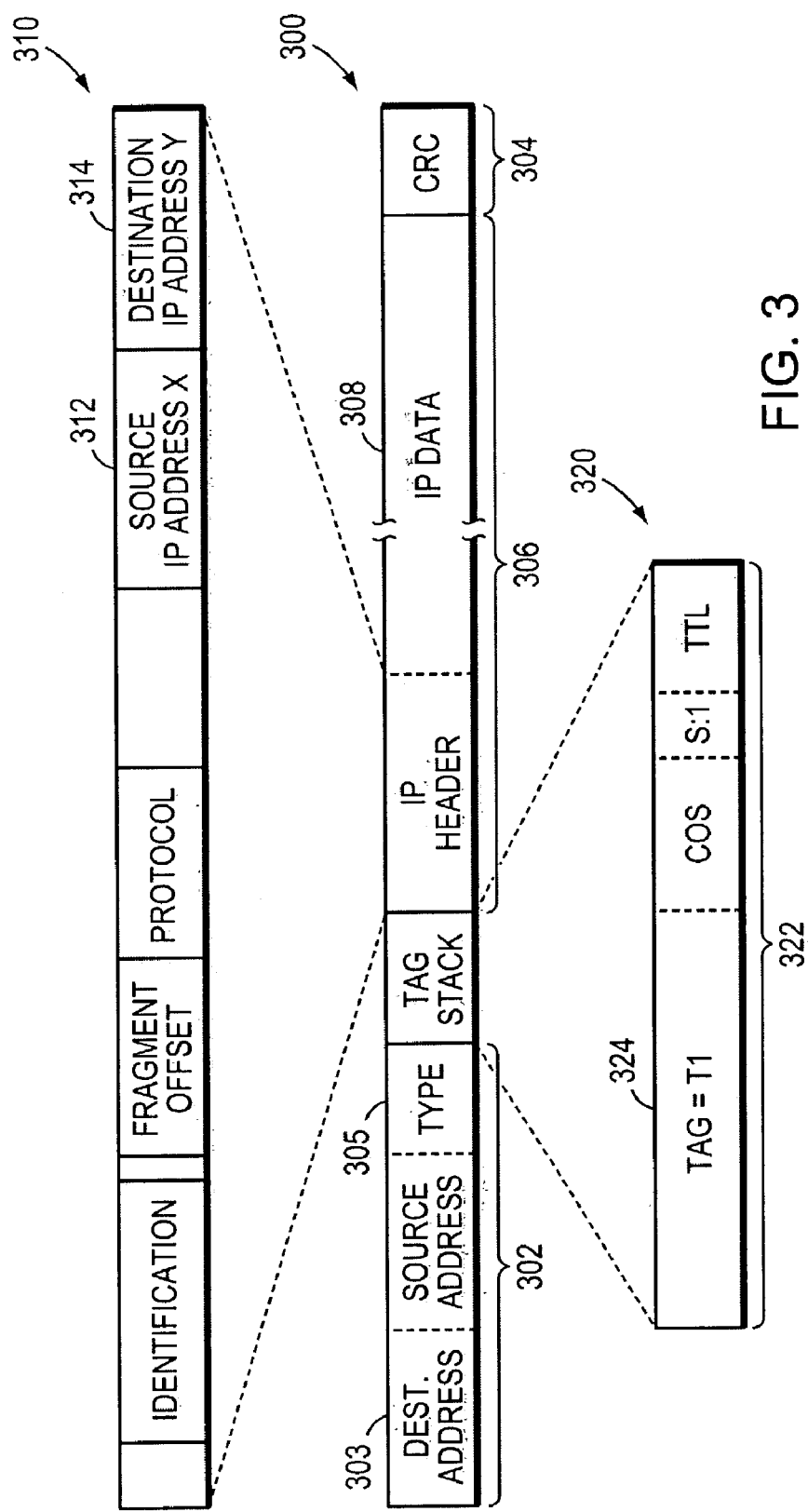
FIG. 3, discussed above, illustrates the format of an Ethernet packet containing a tagged IP datagram and forwarded from one tag-switching router to another.
Figure 4:
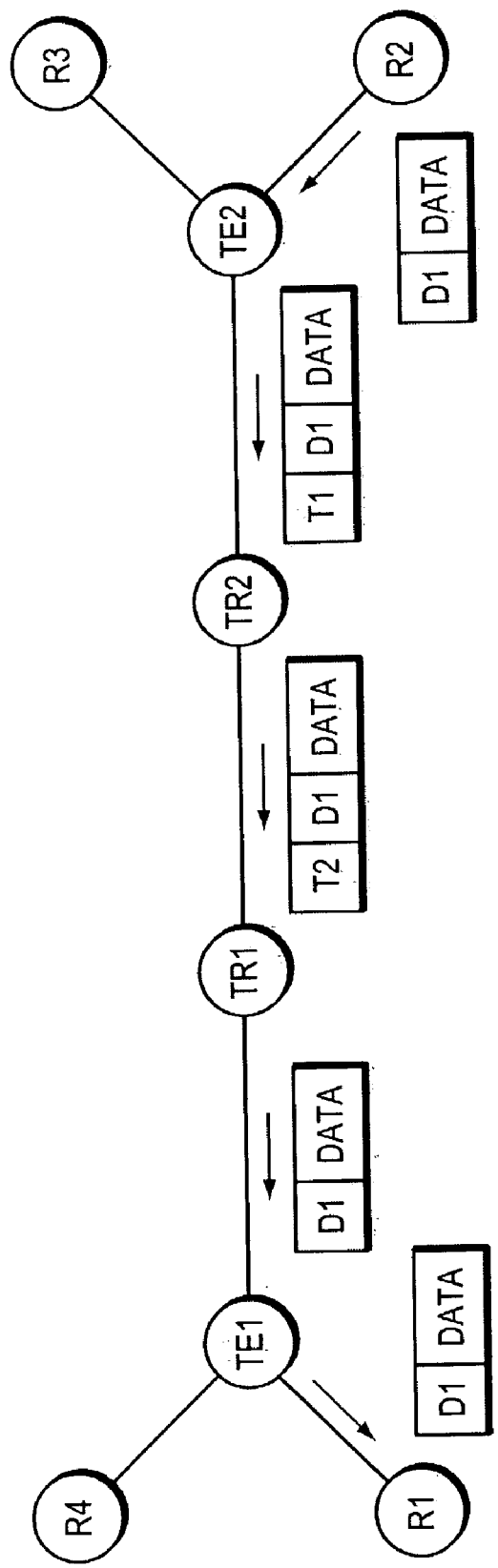
FIG. 4, discussed above, is a topological diagram of a tag-switching network and a tagging sequence employed for a tagged IP datagram.
Figure 5:
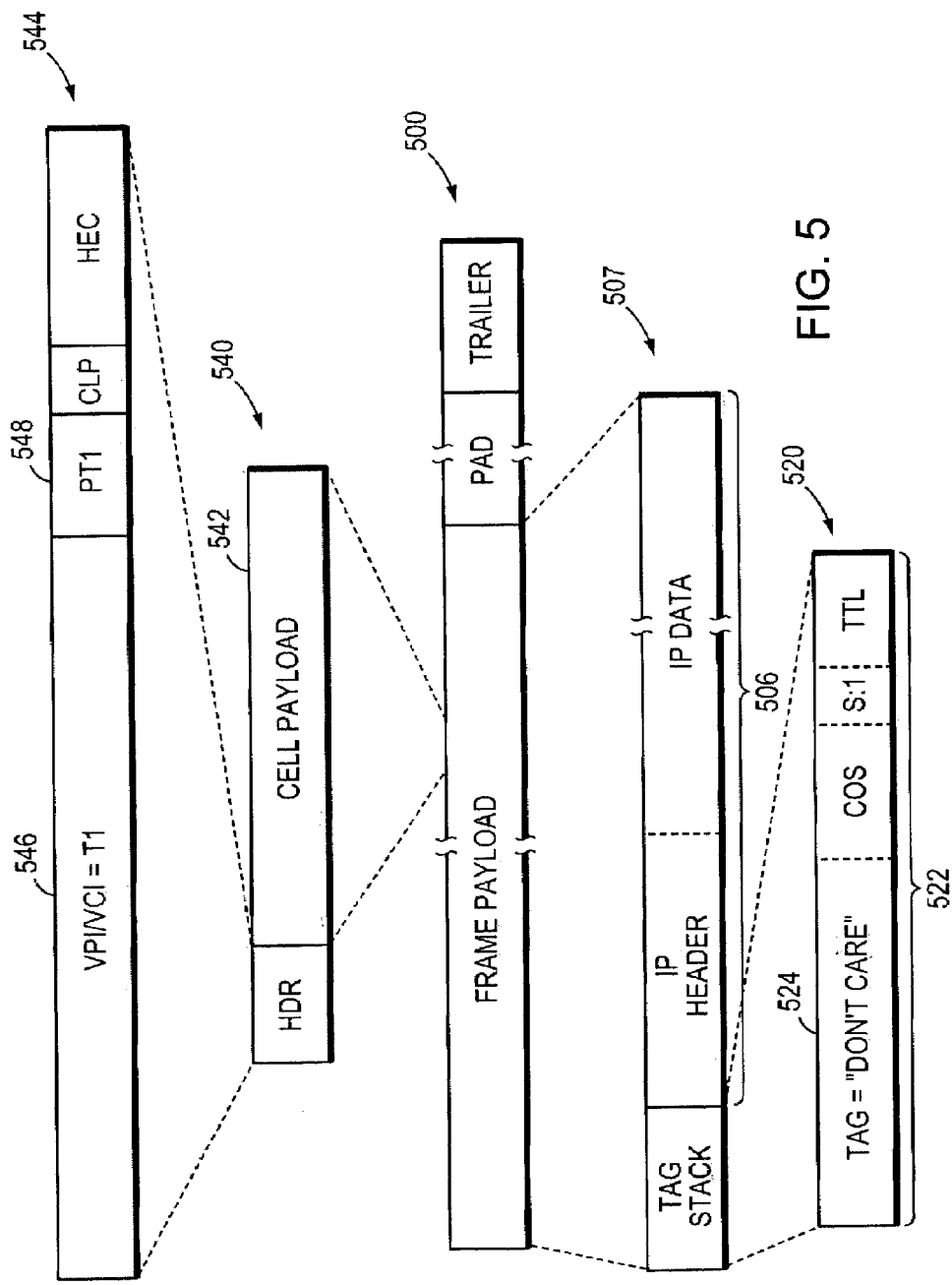
FIG. 5, discussed above, illustrates the format of an ATM frame containing a tagged IP datagram and forwarded from one ATM switch to another.
Figure 6:
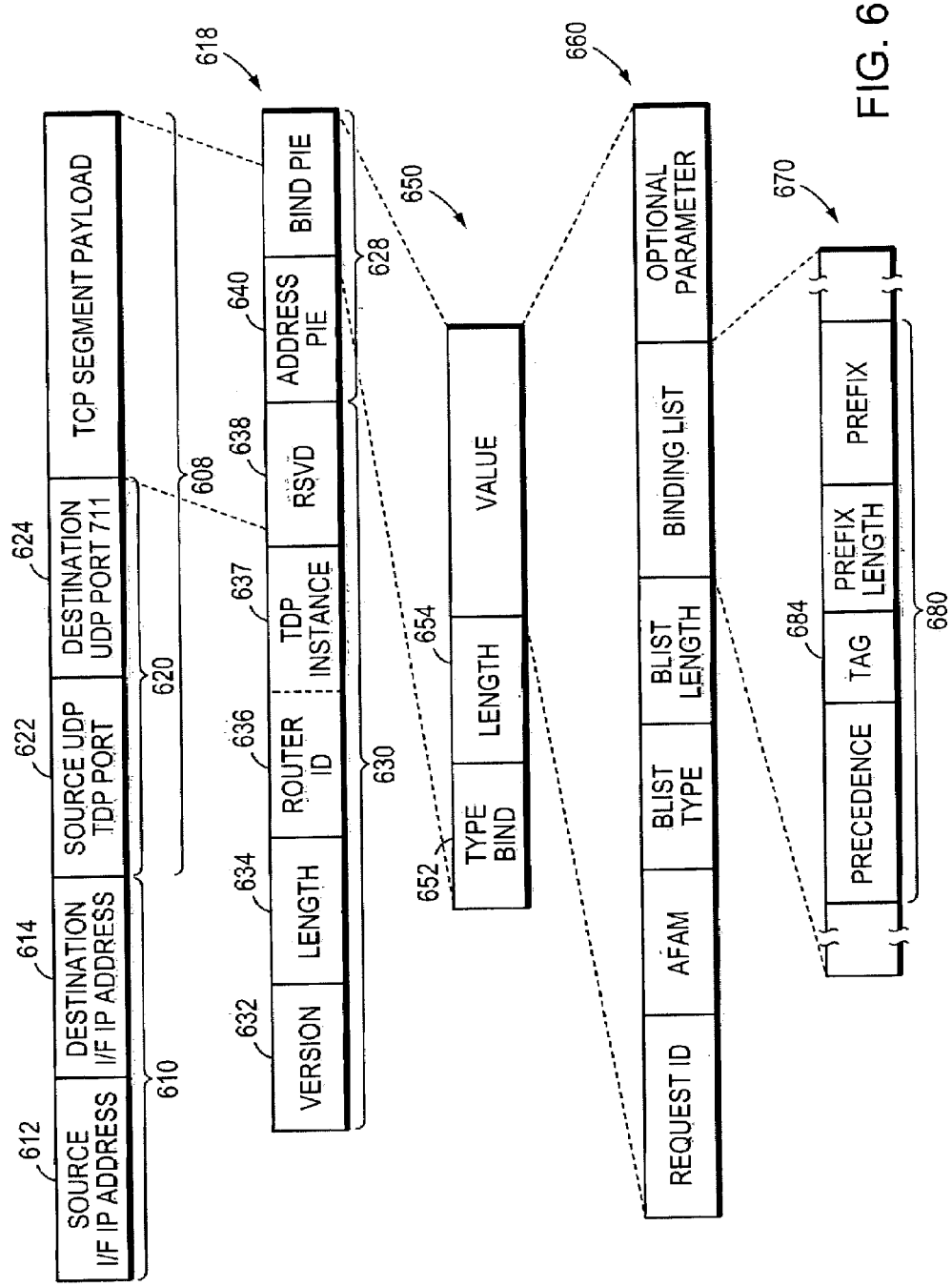
FIG. 6, discussed above, illustrates the format of a TCP segment carrying a TDP PDU containing a Bind PIE and transmitted from one tag-switching router to another.
Figure 7:
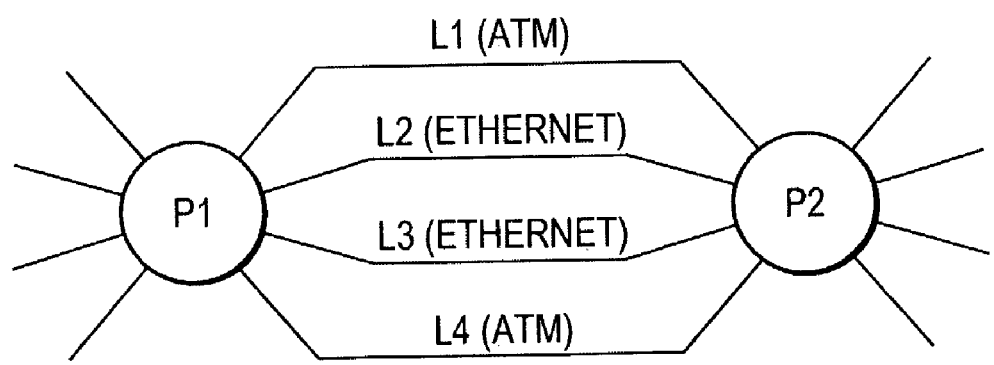
FIG. 7, discussed above, is a topological diagram of two tag-switching router peers interconnected by multiple links, each of which may be enabled for tag-switching.

The present invention also redefines the TDP instance field 637 of the conventional TDP PDU of FIG. 6. The new tag space ID field 1037 identifies the tag space that TSR1 has assigned to the interface from which it multicasts the Hello PIE. Note that the two Ethernet interfaces of FIG. 9B share the same platform-wide tag space, so TSR1 has assigned a tag space of "0," referred to as the "platform-wide" tag space, to links L2 and L3 using the TDP identifier TSR1:0. The ATM interface has its own per-interface tag space and, as an example, TSR1 has assigned a tag space of "1" to the ATM interface using TDP Identifier TSR1:1.

Figure 9A:
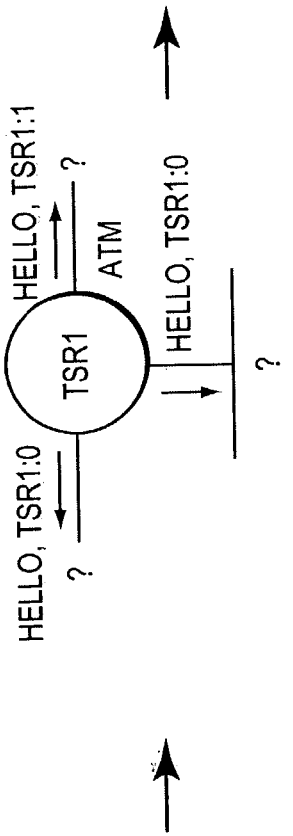
FIG. 9 is a topological diagram illustrating the operation of a TDP discovery mechanism executed by the inventive tag-switching router.
Figure 9B:
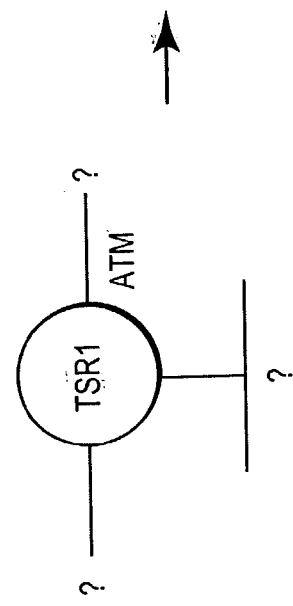
Figure 9C:
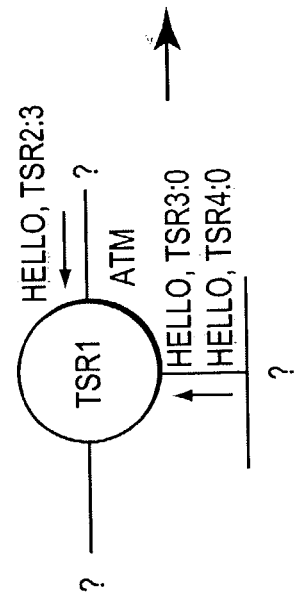
Figure 11:
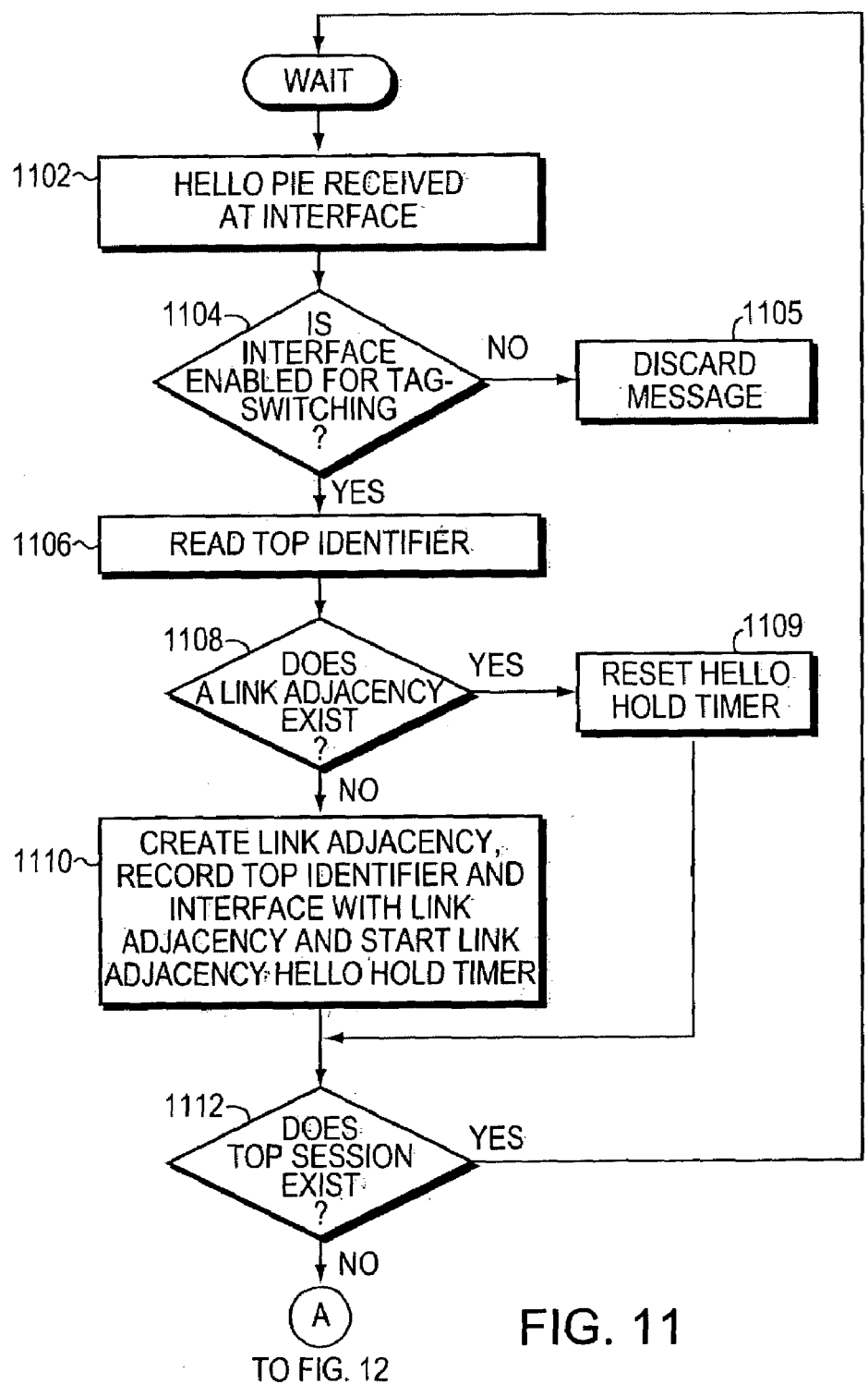
FIG. 11 is flow diagram of a TDP discovery procedure executed by the inventive tag-switching router upon the receipt of a Hello PIE.

The TDP PDU carrying the Hello PIE is placed within the payload field 1018 of a user datagram protocol (UDP) datagram which is, in turn, placed within the payload field 1008 of an IP datagram. The destination IP address field 1014 of the IP datagram header 1010 contains the well-known "all routers on this subnet" multicast address (224.0.0.2), and the source IP address field 1012 contains the IP address of the interface from which the Hello PIE is multicast. The destination UDP port field 1024 of the UDP header 1020 contains the well-known UDP TDP discovery port (711) and the source UDP port field 1022 also contains, by convention, the well-known discovery port (711). In the meantime, TSR1 has received Hello PIEs on two of its three interfaces, as shown in FIG. 9C. A flow diagram of the procedure that TSR1 performs upon each receipt of a Hello PIE is illustrated in FIG. 11. At step 1102, TSR1 receives a Hello PIE at one of its interfaces. TSR1 determines whether the Hello PIE is acceptable at decision step 1104. Typically, the message will be acceptable if the interface at which the Hello PIE was received is enabled for tag-switching. If the Hello PIE is not acceptable, TSR1 discards the message at step 1105. However, if the Hello PIE is acceptable, at step 1106 TSR1 remembers the TDP Identifier from the TDP PDU carrying the Hello PIE and associates it with the interface on which it received the Hello PIE.

At decision step 1108, TSR1 determines whether it has already established a link adjacency with the router ("TSRM") sending the Hello PIE. A link adjacency is created when TSR1 records the TDP identifier from the Hello PIE, associates it with the interface or link that the Hello PIE arrived on, and establishes a hello hold timer for the link adjacency. If a link adjacency has not been established previously, TSR1 establishes one at step 1110. The hello hold timer, in effect, determines how long TSR1 will remember the Hello PIE and corresponding link adjacency. If a subsequent Hello PIE is not received from the TSRM before expiration of the timer, TSR1 will terminate the link adjacency. If a link adjacency has previously been established, TSR1 simply resets the hello hold timer at step 1109.

Figure 9D:
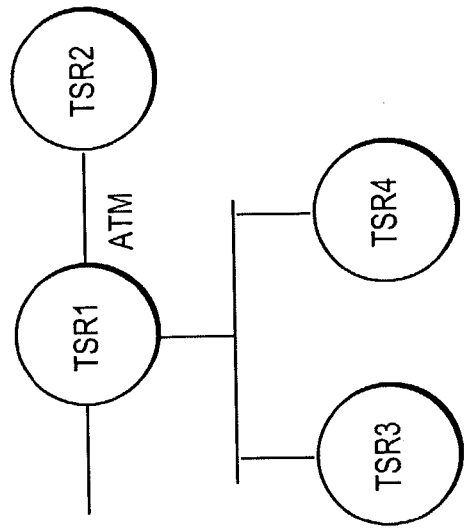

As shown in FIG. 9D, TSR1 has established link adjacencies at two of its three interfaces. Two routers, TSR3 and TSR4, are connected to one of its two Ethernet interfaces. Both of these routers have assigned their platform-wide tag spaces to their Ethernet links to TSR1, as specified in their respective TDP Identifiers, TSR3:0 and TSR4:0. TSR1 also has a router, TSR2, connected to its ATM interface. TSR2 has assigned tag space "3" to its ATM link with TSR1 as specified in TDP Identifier TSR2:3.

At decision step 1112, TSR1 determines whether a TDP session has been established for the link adjacency. Specifically, it matches the TDP identifier (router ID field 1036 and tag space ID field 1037) with the TDP identifiers of established TDP sessions. If there is a match, meaning TSR1 already has a TDP session for the link, TSR1 takes no further action.

Figure 12:
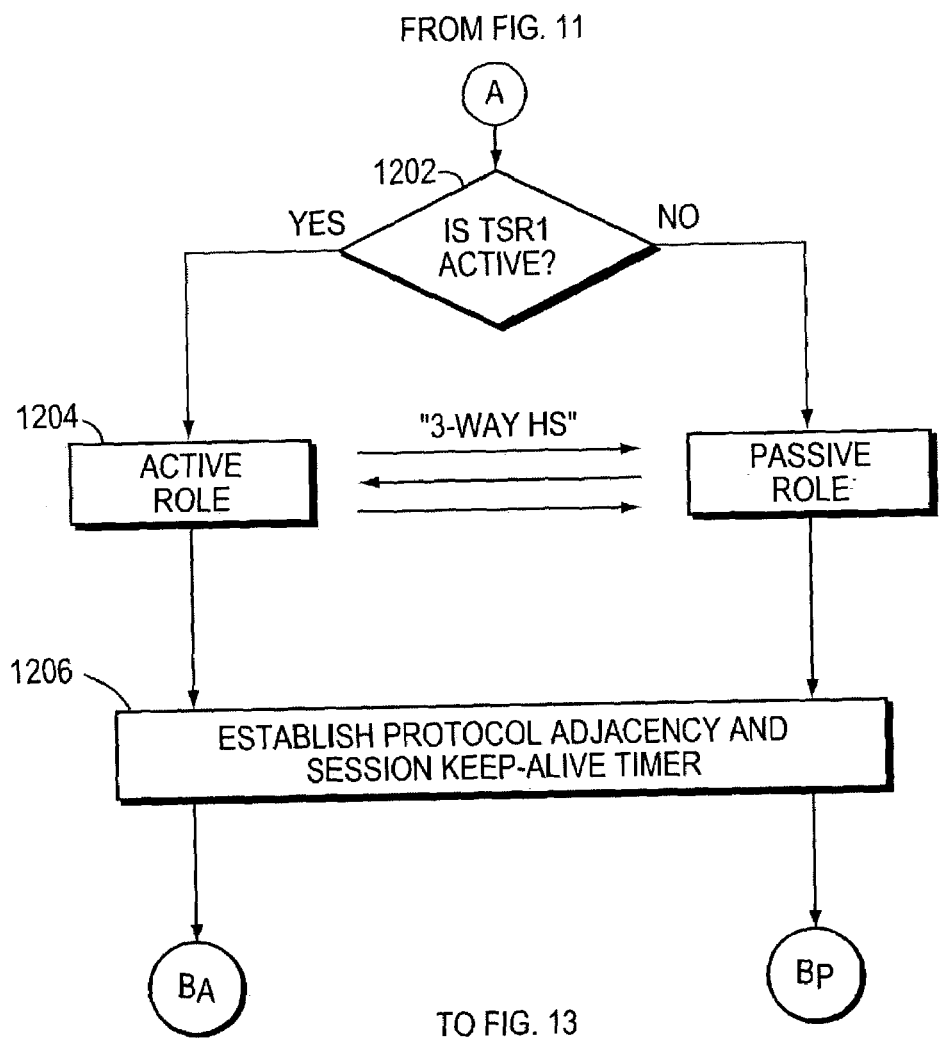
FIG. 12 is flow diagram of a TCP connection procedure executed by the inventive tag-switching router.

If a TDP session does not exist, a TCP connection for a new TDP session must be established between TSR1 and the TSRM. A flow diagram of a TCP connection procedure that may be employed by TSR1 is illustrated in FIG. 12. The procedure is asymmetric in the sense that one of TSR1 or TSRM plays an "active" role and the other plays a "passive" role. At decision step 1202, TSR1 independently determines whether it will be the active or passive router in the TCP connection attempt. The router having the source IP address (from the source IP address field 1012 of the IP header 1010) with the higher unsigned integer value is designated the active router for TDP session purposes. Alternatively, if a router specifies a transport address as an optional parameter in its Hello PIE, the receiving router is to use the unsigned integer value of the transport address in place of the source IP address unsigned integer value. Although the use of the transport address parameter is optional, a tag-switching router typically specifies the router ID address of the TDP identifier as the transport address.

At step 1204, the active router initiates the conventional TCP "three-way hand-shake." If the three-way handshake is successful, the TDP connection between TSR1 and TSRM is established and TSR1 creates a protocol adjacency data structure to represent the session TCP connection with TSRM at step 1206. Note that the protocol adjacency with TSRM has a keep alive timer associated with it which is reset each time a TDP PDU is received from TSRM on the session TCP connection. To avoid expiration of the peer's keep-alive timer, each router periodically transmits a Keep-Alive PIE (not shown). If a Keep-Alive PIE is not received before expiration of the timer, TSR1 assumes that the TCP connection is bad, or that TSRM has failed, and terminates the protocol adjacency which causes the TDP session to be terminated and the TCP connection closed.

Figure 13:
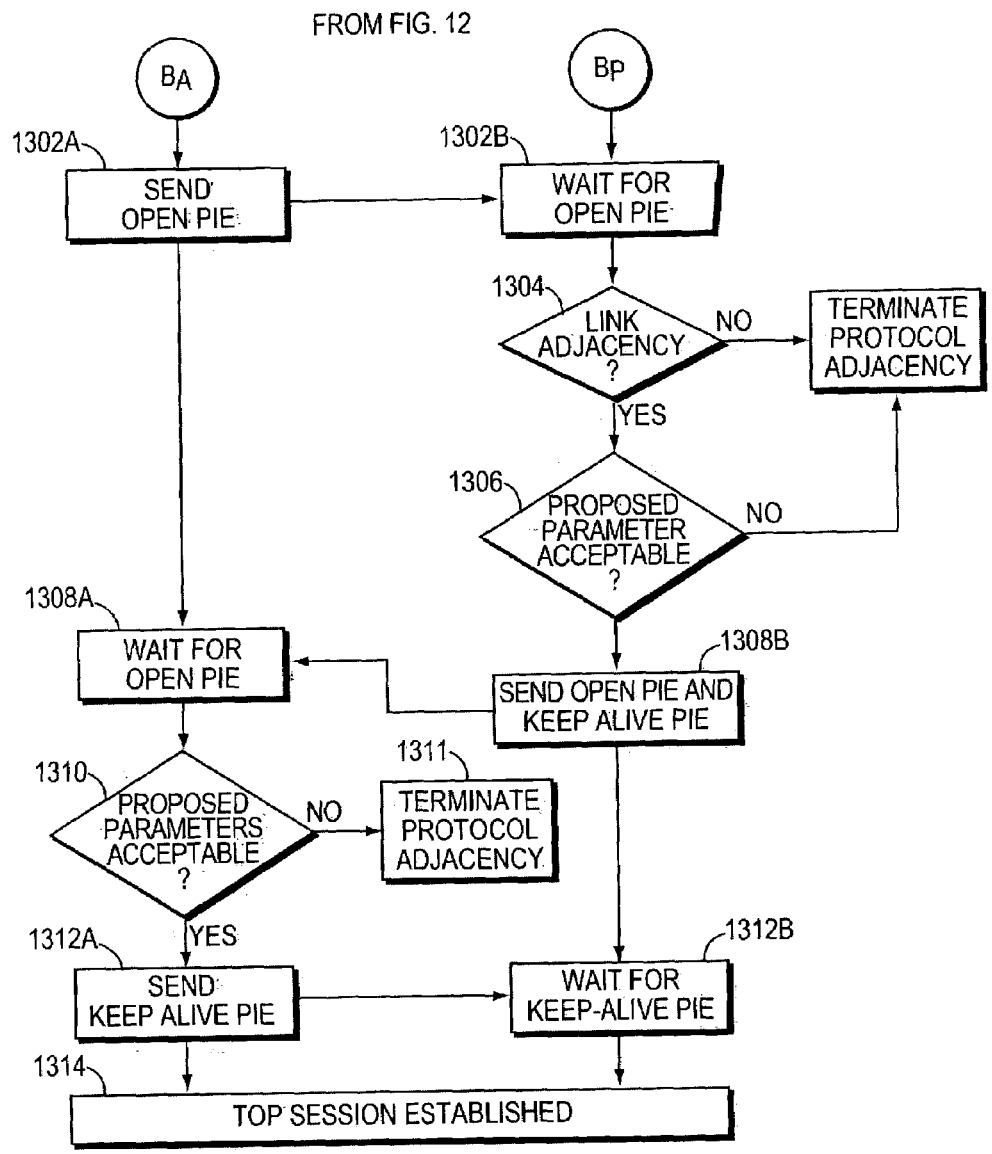
FIG. 13 is flow diagram of a TDP session establishment procedure executed by the inventive tag-switching router.
Figure 14:
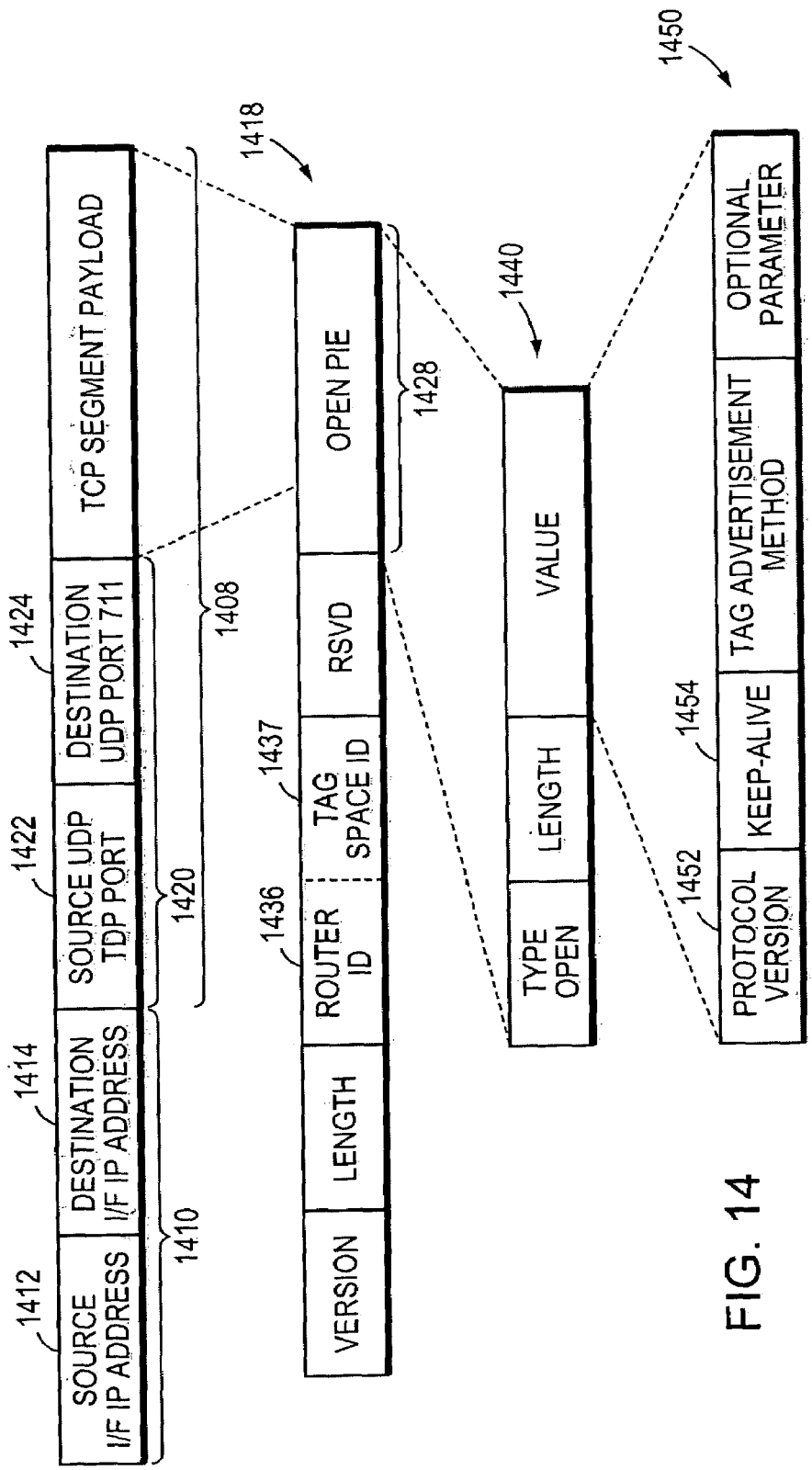
FIG. 14, illustrates the format of a TCP segment carrying a TDP PDU having a header that includes the new tag space ID field and a payload containing an Open PIE, and transmitted by the inventive tag-switching router to another.

When a protocol adjacency has been established, a TDP session can be established. A flow diagram of a TDP session establishment procedure that may be employed by TSR1 is illustrated in FIG. 13. TDP session parameters are negotiated by routers TSR1 and TSRM through the exchange of Open PIEs. An Open PIE is carried in the payload field 1428 of the modified TDP PDU of FIG. 14, wherein the two-octet TDP instance field 637 of the conventional TDP PDU header is redefined as a tag space ID field 1437. The tag space ID field 1437 contains the same tag space as specified in the tag space ID field 1037 of the TDP PDU header of the Hello PIE that triggered the session. The value field 1450 of the Open PIE 1440 is comprised of proposed session parameters, such as the keep-alive interval and the tag advertisement method (downstream unsolicited or downstream on demand).

At step 1302A, the active router transmits to the passive router an Open PIE containing the parameters it proposes for the session. In the meantime, the passive router waits for the Open PIE at step 1302B. At decision step 1304, the passive router matches the TDP identifier (router ID field 1436 and router tag space ID field 1437) with the recorded link adjacency TDP identifiers. If the passive router is unable to match the Open PIE TDP identifier to that of a link adjacency, the passive router refuses the session by closing the TCP connection at step 1305.

At decision step 1306, the passive router determines whether the parameters proposed by the active router are acceptable. If the proposed parameters are not acceptable, it refuses the session by transmitting a Notification PIE and closing the TCP connection at step 1305. If the proposed parameters are acceptable, the passive router returns a Keep-Alive PIE along with an Open PIE containing proposed parameters it proposes for the session at step 1308B. In the meantime, the active router waits for a response to its own Open PIE at step 1308A.

At decision step 1310, the active router determines whether the parameters proposed are acceptable. If the proposed parameters are not acceptable, the active router refuses the session by transmitting a Notification PIE and closing the TCP connection at step 1311. If the proposed parameters are acceptable, the active router returns a Keep-Alive PIE at step 1312A. In the meantime, the passive router waits for a response to its Open PIE at step 1312B.

If both tag-switching routers find the proposed parameters to be acceptable, a TDP session is established at step 1314. The peers can now exchange tag bindings using the Bind PIE. The tag binding set contained in the Bind PIE is identified by the TDP identifier in the TDP PDU header. If the platform-wide tag space (i.e., a tag space ID of "00") has been specified, one or more interfaces associated with the TDP identifier through a link adjacency share the tag bindings for use in the forwarding of tagged data packets. If an interface-specific tag space has been specified, only the interface associated with the TDP identifier through a link adjacency uses the tag bindings. The peers may establish multiple sessions, but only a single TDP session need be established for the platform-wide tag space, with the remaining sessions dedicated to particular links and their assigned tag spaces.

The foregoing has been limited to a specific embodiment of this invention. It will be apparent, however, that variations and modifications may be made to the embodiments, with the attainment of some or all of their advantages. Therefore, it is the object of the appended claims to cover all such variations and modifications as come within the true spirit and scope of the invention.

What is claimed is:

1. A method for establishing tag switching in a router, comprising:
   transmitting a Hello message, said Hello message having an identifier of a first tag space for an interface of said router;
   receiving a reply message transmitted by a peer router in response to said hello message, said reply message identifying a second tag space, said second tag space available to said peer router for establishing tag switching with said interface; and transmitting a Bind message to said peer router, said Bind message establishing tag switching in said second tag space.

2. A method as in claim 1 further comprising:
appending outgoing packets with tags, said tags designating said established tag switching relationship with said peer router; and
transmitting said packets to said peer router.

3. A method as in claim 1 further comprising: wherein said Hello message is in a tag distribution protocol (TDP) protocol data unit (PDU).

4. A method for establishing tag switching in a router, comprising:
receiving a Hello message from a peer router, said Hello message having an identifier of a first tag space for an interface of said peer router;
transmitting a reply message in response to said hello message, said reply message identifying a second tag space, said second tag space available to said router for establishing tag switching with said interface; and
receiving a Bind message from said peer router, said Bind message establishing tag switching in said second tag space.

5. A method as in claim 4 further comprising:
receiving incoming packets with tags, said tags designating said established tag switching relationship with said peer router.

6. A method as in claim 4 further comprising: wherein said Hello message is in a tag distribution protocol (TDP) protocol data unit (PDU).

7. A router, comprising:
one or more interfaces enabled for tag-switching, each interface having an assigned tag space;
circuitry at each interface to periodically multicast an output Hello message having a router identifier identifying the tag space assigned to the interface by the router;
circuitry at each interface to respond to an input Hello message from a peer, the input Hello message having a peer identifier identifying a tag space assigned to the interface by the peer, wherein the router records the peer identifier in a record associated with the interface to create a link adjacency;
circuitry to transmit to the peer an output Bind message containing advertised tag bindings corresponding to the tag space identified by the router identifier, the advertised tag bindings containing incoming tags;
circuitry to receive from the peer an input Bind message containing learned tag bindings corresponding to the tag space identified by the peer identifier, the learned tag bindings containing outgoing tags; and
circuitry to append the outgoing tags to packets having destination addresses bound to the learned tag bindings and to forward the tagged packets to the peer from an interface assigned the peer identifier.

8. A tag-switching router, comprising:
circuitry to transmit a Hello message, said Hello message having an identifier of a first tag space for an interface of said router;
circuitry to receive a reply message transmitted by a peer router in response to said hello message, said reply message identifying a second tag space, said second tag space available to said peer router for establishing tag switching with said interface; and
circuitry to transmit a Bind message to said peer router, said Bind message establishing tag switching in said second tag space.

9. A tag-switching router as in claim 8 further comprising:
circuitry to append outgoing packets with tags, said tags designating said established tag switching relationship with said peer router; and
circuitry to transmit said packets to said peer router.

10. A tag-switching router as in claim 8 further comprising: wherein said Hello message is in a tag distribution protocol (TDP) protocol data unit (PDU).

11. A tag-switching router, comprising:
circuitry to receive a Hello message from a peer router, said Hello message having an identifier of a first tag space for an interface of said peer router;
circuitry to transmit a reply message in response to said hello message, said reply message identifying a second tag space, said second tag space available to said router for establishing tag switching with said interface; and
circuitry to receive a Bind message from said peer router, said Bind message establishing tag switching in said second tag space.

12. A tag-switching router as in claim 11 further comprising:
circuitry to receive incoming packets with tags, said tags designating said established tag switching relationship with said peer router.

13. A tag-switching router as in claim 11 further comprising: wherein said Hello message is in a tag distribution protocol (TDP) protocol data unit (PDU).

14. A tag-switching router, comprising:
means for transmitting a Hello message, said Hello message having an identifier of a first tag space for an interface of said router;
means for receiving a reply message transmitted by a peer router in response to said hello message, said reply message identifying a second tag space, said second tag space available to said peer router for establishing tag switching with said interface; and
means for transmitting a Bind message to said peer router, said Bind message establishing tag switching in said second tag space.

15. A tag-switching router, comprising:
means for receiving a Hello message from a peer router, said Hello message having an identifier of a first tag space for an interface of said peer router;
means for transmitting a reply message in response to said hello message, said reply message identifying a second tag space, said second tag space available to said router for establishing tag switching with said interface; and
means for receiving a Bind message from said peer router, said Bind message establishing tag switching in said second tag space.

16. An apparatus comprising:
an interface to receive a Hello protocol information element (PIE) from a peer, the Hello PIE including an identification of a tag space assigned to the interface by the peer;
the interface further to receive an Bind PIE from the peer, the Bind PIE to include a set of learned tag bindings that correspond to the tag space identified by the peer;
a processor to append tags to received data packets having destination addresses associated with the learned tag bindings; and
wherein the interface is further to forward the tagged data packets to the peer.

17. The apparatus of claim 16 wherein the tag space is a platform-wide tag space assigned to a plurality of interfaces.

18. The apparatus of claim 16 wherein identification of the tag space comprises:
- a router identifier (ID) that uniquely identifies a router on a network; and
- a tag space ID that uniquely identifies a tag space inside the router.

19. The apparatus of claim 16 wherein the interface is further to transmit a Hello message, the Hello message having an identifier of a tag space assigned to the interface by the apparatus.

20. The apparatus of claim 16 further comprising:
- a memory to store the identification of the tag space assigned to the interface by the peer, to create a link adjacency.

21. The apparatus of claim 16 wherein the interface is further to transmit to the peer a Bind message, the Bind message to include a set of advertised tag bindings that correspond to a tag space assigned to the interface by the apparatus.

* * * * *